United States Patent
Sun et al.

(10) Patent No.: US 11,465,783 B2
(45) Date of Patent: Oct. 11, 2022

(54) SINGLE-GIMBAL MAGNETICALLY SUSPENDED CONTROL MOMENT GYROSCOPE

(71) Applicant: BEIHANG UNIVERSITY, Beijing (CN)

(72) Inventors: Jinji Sun, Beijing (CN); Jiye Zhao, Beijing (CN); Jiqiang Tang, Beijing (CN); Yun Le, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 329 days.

(21) Appl. No.: 16/689,913

(22) Filed: Nov. 20, 2019

(65) Prior Publication Data
US 2020/0165010 A1    May 28, 2020

(30) Foreign Application Priority Data

Nov. 26, 2018   (CN) .......................... 201811414882.0

(51) Int. Cl.
  *B64G 1/28*   (2006.01)
  *B64G 1/36*   (2006.01)
(52) U.S. Cl.
  CPC .............. *B64G 1/286* (2013.01); *B64G 1/36* (2013.01)
(58) Field of Classification Search
  CPC . B64G 1/286; B64G 1/36; B64G 1/22; B64G 1/24; B64G 1/28
  See application file for complete search history.

(56) References Cited

U.S. PATENT DOCUMENTS

| | | | | |
|---|---|---|---|---|
| 5,419,212 A | * | 5/1995 | Smith ...................... | B64G 1/32 74/5.1 |
| 6,135,392 A | * | 10/2000 | Wakugawa ............ | B64G 1/283 244/164 |

(Continued)

FOREIGN PATENT DOCUMENTS

| | | | | | |
|---|---|---|---|---|---|
| CN | 104118579 B | * | 10/2014 | ............. | B64G 1/286 |
| CN | 104176277 A | * | 12/2014 | ............. | B64G 1/286 |

(Continued)

OTHER PUBLICATIONS

EPO Machine Translation of CN 104118579A of Sun et al., Oct. 29, 2014. (Year: 2014).*

(Continued)

Primary Examiner — Vinh Luong
(74) Attorney, Agent, or Firm — Marshall, Gerstein & Borun LLP

(57) ABSTRACT

A magnetically suspended control moment gyroscope comprising: a gimbal; a flywheel system, set in the gimbal; wherein the flywheel system comprises: a housing; a shaft, arranged in an inner cavity of the housing; a radial magnetic bearing, comprising: a first rotor portion and a first stator portion fixed to the shaft; an upper axial magnetic bearing and a lower axial magnetic bearing, wherein the upper axial magnetic bearing is fixed to an upper end of the first stator portion, the lower axial magnetic bearing is fixed to a lower end of the first stator portion; a wheel body, set in the radial magnetic bearing, fixed to the first rotor portion; an upper axial thrust plate and a lower axial thrust plate, wherein the upper axial thrust plate is fixed to an upper end of the wheel body, and is on an upper end of the upper axial magnetic bearing, the lower axial thrust plate is fixed to a lower end of the wheel body, and is under a lower end of the lower axial magnetic bearing.

13 Claims, 14 Drawing Sheets

(56) References Cited

U.S. PATENT DOCUMENTS

| | | | | |
|---|---|---|---|---|
| 2017/0334553 A1* | 11/2017 | Welsh | .................. | B64C 27/001 |
| 2019/0074751 A1* | 3/2019 | Chen | .................. | H02K 11/215 |
| 2021/0323658 A1* | 10/2021 | Welsh | .................... | F16F 15/30 |

FOREIGN PATENT DOCUMENTS

| | | | | | |
|---|---|---|---|---|---|
| CN | 109229426 A | * | 1/2019 | ............. | B64G 1/286 |
| CN | 112729250 A | * | 4/2021 | ............. | G01C 11/02 |
| WO | WO 9414653 | * | 1/1994 | ............. | B64G 1/286 |

OTHER PUBLICATIONS

Translation of CN 104176277A of Sun et al., Dec. 3, 2014 (Year: 2014).*
EPO Machine Translation of CN 109229426A of Sun et al., Jan. 18, 2019 (Year: 2019).*
Define equilibrium, Google Search, Dec. 12, 2021 (Year: 2021).*
Define mechanical equilibrium, Google Search, Dec. 12, 2021 (Year: 2021).*
Mechanical equilibrium, Wikipedia, Dec. 3, 2021 (Year: 2021).*
Mechanical Equilibrium, Purdue M-STEM, Feb. 12, 2021 (Year: 2021).*

\* cited by examiner

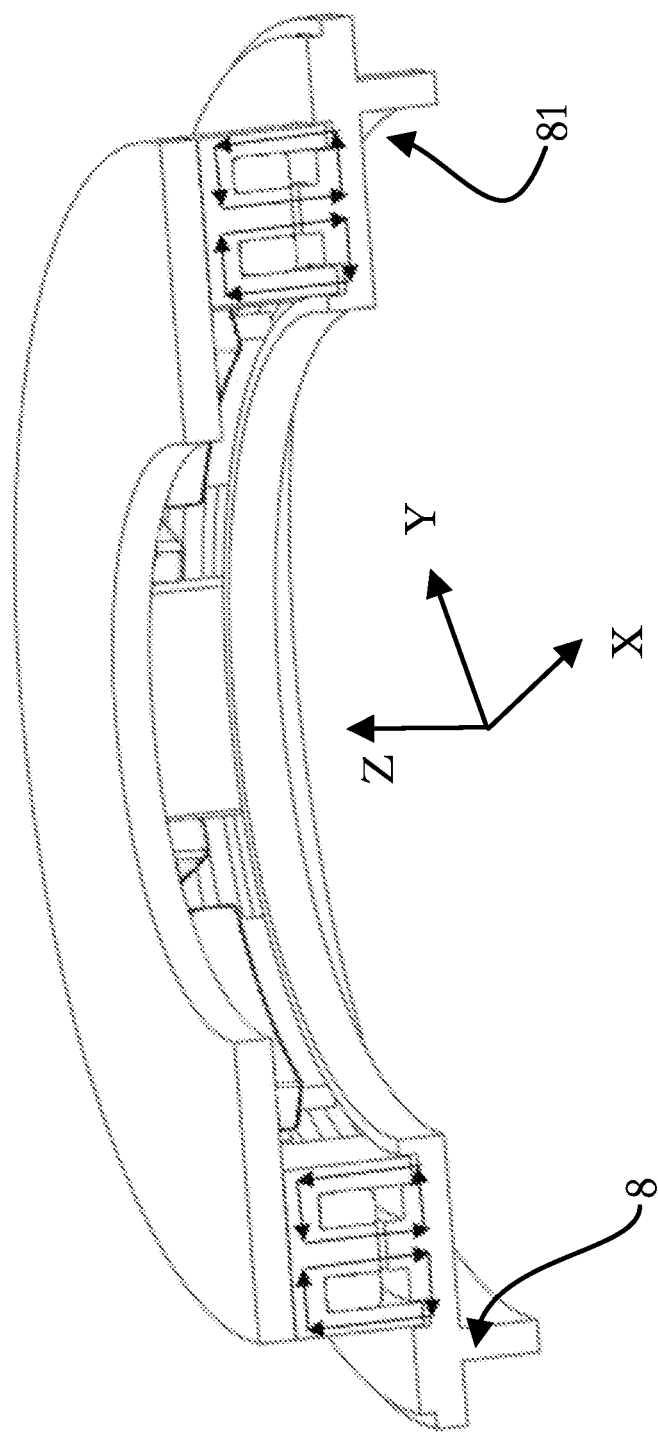

SINGLE-GIMBAL MAGNETICALLY SUSPENDED CONTROL MOMENT GYROSCOPE

CROSS-REFERENCE TO RELATED APPLICATIONS

This application claims the benefit of priority to Chinese Patent Application No. 201811414882.0, "Five Degrees of Freedom Single-Gimbal Magnetically Suspended Control Moment Gyroscope" filed on Nov. 26, 2018. The entire disclosure of the above application is incorporated herein by reference.

TECHNICAL FIELD

The present disclosure generally relates to a single-gimbal magnetically suspended control moment gyroscope (MSCMG).

BACKGROUND OF THE DISCLOSURE

Control Moment Gyroscope (CMG) is a kind of inertia actuator of attitude control system used on large-scale satellites, earth observation platforms, space stations and other large space crafts. The actuator needs to output a large moment meeting the requirements of light weight, small volume, high reliability, high accuracy, long life, fast response speed and low power consumption.

SUMMARY

According to some embodiments of the present disclosure, a MSCMG is provided, including:
- a gimbal (17); and
- a flywheel system, set in the gimbal (17);
- wherein the flywheel system includes:
  - a housing (14);
  - a shaft (2), arranged in an inner cavity of the housing (14);
  - a radial magnetic bearing (1), including: a first rotor portion (109) and a first stator portion (108) fixed to the shaft (2);
  - an upper axial magnetic bearing (3) and a lower axial magnetic bearing (4), wherein the upper axial magnetic bearing (3) is fixed to an upper end of the first stator portion (108), and the lower axial magnetic bearing (4) is fixed to a lower end of the first stator portion (108);
  - a wheel body (13), set in the radial magnetic bearing (1), fixed to the first rotor portion (109); and
  - an upper axial thrust plate (7) and a lower axial thrust plate (8), wherein the upper axial thrust plate (7) is fixed to an upper end of the wheel body (13), and is on an upper end of the upper axial magnetic bearing (3), the lower axial thrust plate (8) is fixed to a lower end of the wheel body (13), and is under a lower end of the lower axial magnetic bearing (4).

Other aspects or embodiments of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 5b shows electromagnetic circuits formed by coil current of axial magnetic bearing stator units placed in the lower axial magnetic bearing in ±45° and ±135° directions according to various embodiments of the present disclosure;

DETAILED DESCRIPTION OF THE DISCLOSURE

Figure 1:
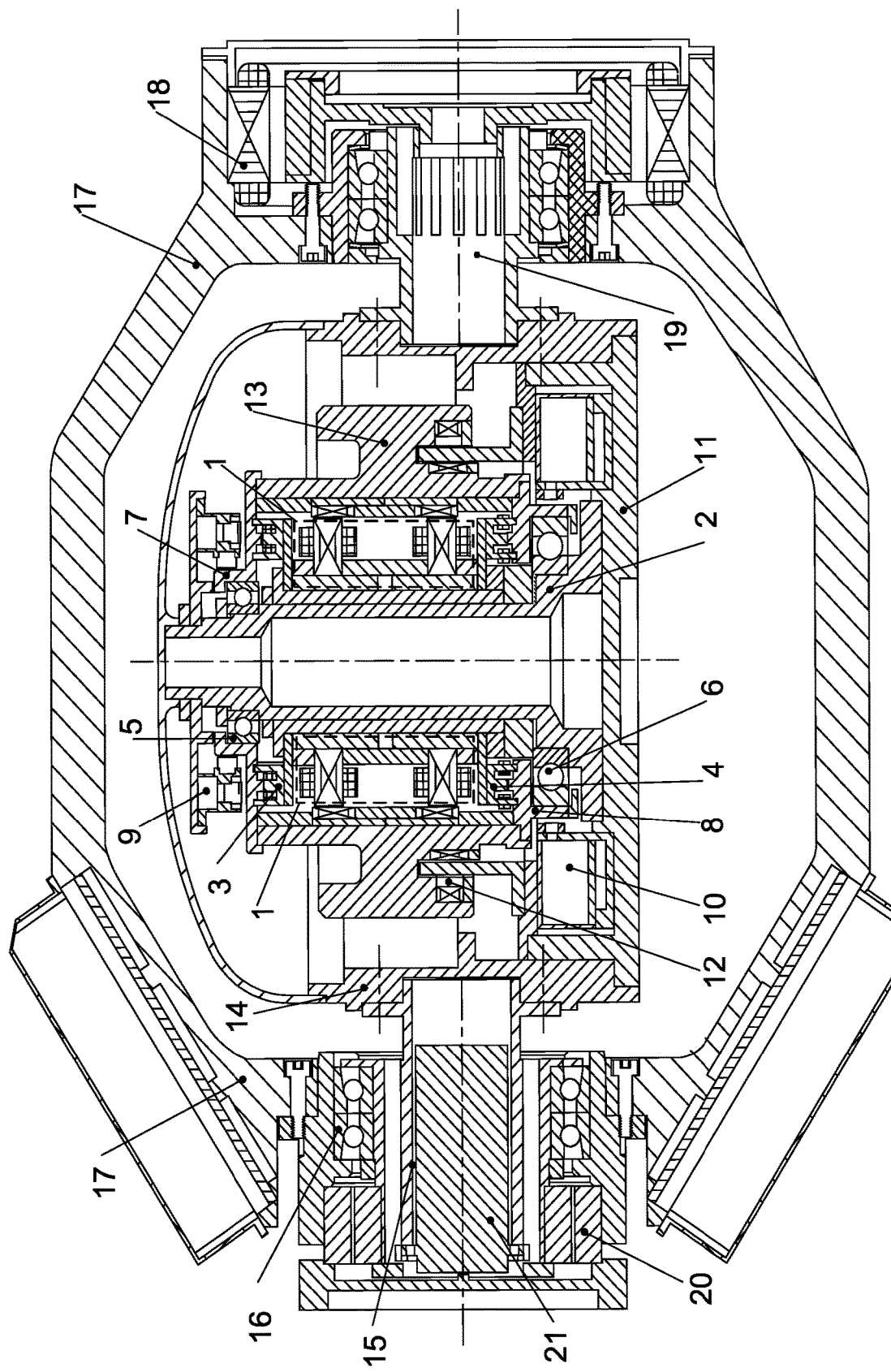
FIG. 1 shows a schematic diagram of a five degrees of freedom (DOFs) single-gimbal MSCMG according to various embodiments of the present disclosure.

At present, a CMG supported by mechanical bearings is still generally adopted as an actuator in the spacecraft attitude control system, and the mechanical bearings fundamentally restrict the improvement of rotating speed of the CMG. Therefore, when a large angular momentum is required, the weight and volume of the CMG have to be increased. In addition, the mechanical bearings have problems such as mechanical wear, uncontrollable unbalanced vibration and large zero-crossing friction moment, which seriously affect the service life of the CMG and the accuracy and stability of the spacecraft attitude control. Therefore, single-gimbal MSCMG supported by magnetic bearings is required to be taken as an inertial actuator on the large-scale spacecraft. According to suspension DOFs, the conventional single-gimbal MSCMG may be divided into one DOF single-gimbal MSCMG to five DOFs single-gimbal MSCMG. The conventional five DOFs single-gimbal MSCMG controls two radial tilting motions of a wheel body through two radial magnetic bearings. However, in order to output sufficient moment, a span between the two radial magnetic bearings is usually increased, so that the length of shaft is increased, the mode is reduced, and the rotating speed is increased, which leads to system instability and vibration aggravation.

The technical problem solved by the present disclosure is to: overcome the inadequacies of the existing art, provide a five DOFs single-gimbal MSCMG, improve the energy density, reduce the volume and power consumption and improve the ability to output the moment by controlling two radial tilting motions by two axial magnetic bearings.

The technical solution of the present disclosure is as follows: a five DOFs single-gimbal MSCMG includes: a radial magnetic bearing (1), a shaft (2), an upper axial magnetic bearing (3), a lower axial magnetic bearing (4), an upper protective bearing (5), a lower protective bearing (6), an upper axial thrust plate (7), a lower axial thrust plate (8), an integrated displacement sensor for radial and axial directions (9), a radial displacement sensor (10), a base (11), a high-speed motor (12), a wheel body (13), a housing (14), a gimbal shaft (15), mechanical bearings (16), a gimbal (17), a gimbal motor (18), a gimbal motor shaft (19), an angular position sensor (20) and a conductive slip ring (21).

The radial magnetic bearing (1) is located in a middle part of the housing (14), and stator parts of the radial magnetic bearing (1) are nested on the shaft (2) located in the center of the housing (14).

The upper axial magnetic bearing (3) and the lower axial magnetic bearing (4) are respectively on the upper end of the first stator portion (108) of the radial magnetic bearing (1) and under the lower end of the first stator portion (108) of the radial magnetic bearing (1), they respectively consists of eight axial magnetic bearing stator units, and are fixed to the shaft (2), wherein each of axial magnetic bearing stator units is "E"-shaped.

The upper protective bearing (5) is on an upper end of the upper axial magnetic bearing (3), the lower protective bearing (6) is under the lower end of the lower axial magnetic bearing (4), and the upper protective bearing (5) and the lower protective bearing (6) are also fixed to the shaft (2).

The upper axial thrust plate (7) is arranged outside the upper protective bearing (5) in radial direction, a "凵"-shaped groove is located on the upper axial thrust plate (7), the lower axial thrust plate (8) is arranged outside the lower protective bearing (6) in radial direction, a "凵"-shaped groove is located on the lower axial thrust plate (8), radial protective gaps and axial protective gaps are formed between the upper protective bearing (5) and the upper axial thrust plate (7), and radial protective gaps and axial protective gaps are formed between the lower protective bearing (6) and the lower axial thrust plate (8).

The integrated displacement sensor for radial and axial directions (9) is arranged outside the upper axial thrust plate (7) in radial direction, and the radial displacement sensor (10) is arranged outside the lower axial thrust plate (8) in radial direction, wherein radial detection gaps are formed among the upper axial thrust plate (7) and radial probes of the integrated displacement sensor for radial and axial directions (9), axial detection gaps are formed among the upper axial thrust plate (7) and axial probes of the integrated displacement sensor for radial and axial directions (9), the integrated displacement sensor for radial and axial directions (9) is fixedly connected with the shaft (2) through a sensor base, radial detection gaps are formed among the lower axial thrust plate (8) and probes of the radial displacement sensor (10), and the radial displacement sensor (10) is fixedly connected with the base (11) through a sensor base.

A stator part of the high-speed motor (12) is fixedly connected with the base (11) through a connecting plate, an outer rotor core of the high-speed motor (12) is arranged outside the stator part of the high-speed motor (12), an inner rotor core is arranged inside the stator part of the high-speed motor (12), the outer rotor core and the inner rotor core are installed at a lower part of the wheel body (13), and an inside air gap and an outside air gap are respectively formed among the stator part of the high-speed motor (12) and the inner rotor core and the outer rotor core.

The first rotor portion (109) of the radial magnetic bearing (1) is fixedly connected with an inner side of the wheel body (13) through an interference fit, and the housing (14) is outside the wheel body (13) and connected with the base (11) through screws to seal the wheel body.

A right end of the gimbal shaft (15) is connected with a groove of the housing (14), a middle part of the gimbal shaft (15) is connected with the gimbal (17) through the mechanical bearings (16), the fifth stator portion of the gimbal motor (18) is connected with a right end of the gimbal (17) through an interference fit, a fifth rotor portion of the gimbal motor (18) is connected with a right end of the gimbal motor shaft (19), a left end of the gimbal motor shaft (19) is connected with the housing (14), the fourth stator portion of the angular position sensor (20) is connected with a left end of the gimbal (17) and also connected with a stator outer ring of the conductive slip ring (21), and the fourth rotor portion of the angular position sensor (20) and a rotor of the conductive slip ring (21) are fixedly connected with the gimbal shaft (15).

The radial magnetic bearing (1) includes a stator magnetic ring (101), a stator permanent magnet (102), a stator core (103), coils (104), a rotor magnetic ring (105), a rotor core (106) and air gaps (107). The stator magnetic ring (101) includes an upper stator magnetic ring (1011) and a lower stator magnetic ring (1012). The stator permanent magnet (102) is located between the upper stator magnetic ring (1011) and the lower stator magnetic ring (1012). The stator core (103) includes an upper stator core (1031) and a lower stator core (1032). The upper stator core (1031) and the lower stator core (1032) respectively includes four magnetic poles in ±X and ±Y directions, the stator core (103) form eight magnetic poles at the upper and the lower ends of the radial magnetic bearing (1), and the coils (104) are wound on the magnetic poles of the upper stator core (1031) and the lower stator core (1032). The rotor core (106) includes an upper rotor core (1061) and a lower rotor core (1062), and is outside the stator core (103). The air gaps (107) are between the magnetic poles of the rotor core (106) and the stator core (103), and the rotor magnetic ring (105) is arranged at the exterior of the rotor core (106).

The upper axial magnetic bearing (3) consists of eight axial magnetic bearing stator units (114), each of the axial magnetic bearing stator units (114) consists of three stator magnetic poles, wherein a first stator magnetic pole is a protruding magnetic pole inside each of the axial magnetic bearing stator units (114), a second stator magnetic pole is a sunken magnetic pole in the middle of each of the axial magnetic bearing stator units (114), and a third stator magnetic pole is a protruding magnetic pole outside each of the axial magnetic bearing stator units (114). The three stator magnetic poles form an inside air gap, a middle air gap and an outside air gap respectively with an inner side depression, a middle protrusion and an outer side depression of a "凹"-shaped structure of the upper axial thrust plate (7). The axial magnetic bearing stator units (114) are "E"-shaped, and are respectively arranged on an upper axial magnetic bearing adapter plate (115) in ±X, ±Y, ±45° and ±135° directions. Inner coils (112) are wound on the first stator magnetic poles of the axial magnetic bearing stator units (114) placed in the ±X and ±Y directions, outer coils (113) are wound on the third stator magnetic poles of the axial magnetic bearing stator units (114) placed in the ±X and ±Y directions, and middle coils (111) are wound on the second stator magnetic poles of the axial magnetic bearing stator units (114) in the ±45° and ±135° directions.

The lower axial magnetic bearing (4) and the upper axial magnetic bearing (3) have the same structure. The lower axial magnetic bearing (4) is opposite to the upper axial magnetic bearing (3).

The integrated displacement sensor for radial and axial directions (9) has four orthogonally placed radial probes and four orthogonally placed axial probes, wherein the radial probes complete detection of two radial translational displacements of the wheel body (13). The axial probes complete detection of three displacements including an axial translation of the wheel body (13), a radial tilting around a X axis and a radial tilting around Y axis.

The angular position sensor (20) may be a rotary transformer or a photoelectric encoder.

The principle of the solution is: the single-gimbal CMG consists of a flywheel system and a gimbal, wherein a centroid of the flywheel system is located in the center of an axis of the gimbal shaft (15). The rotating speed of the flywheel system is controlled by a rotating speed control part to keep constant speed state and provide a specific angular momentum. An angular momentum direction of the flywheel system is changed with change of the axis of the gimbal shaft, and thus, the flywheel system outputs a moment by gyroscopic effect, of which the value is equal to a cross product of an angular momentum vector of the flywheel system and a rotating speed vector of the gimbal.

Figure 2:
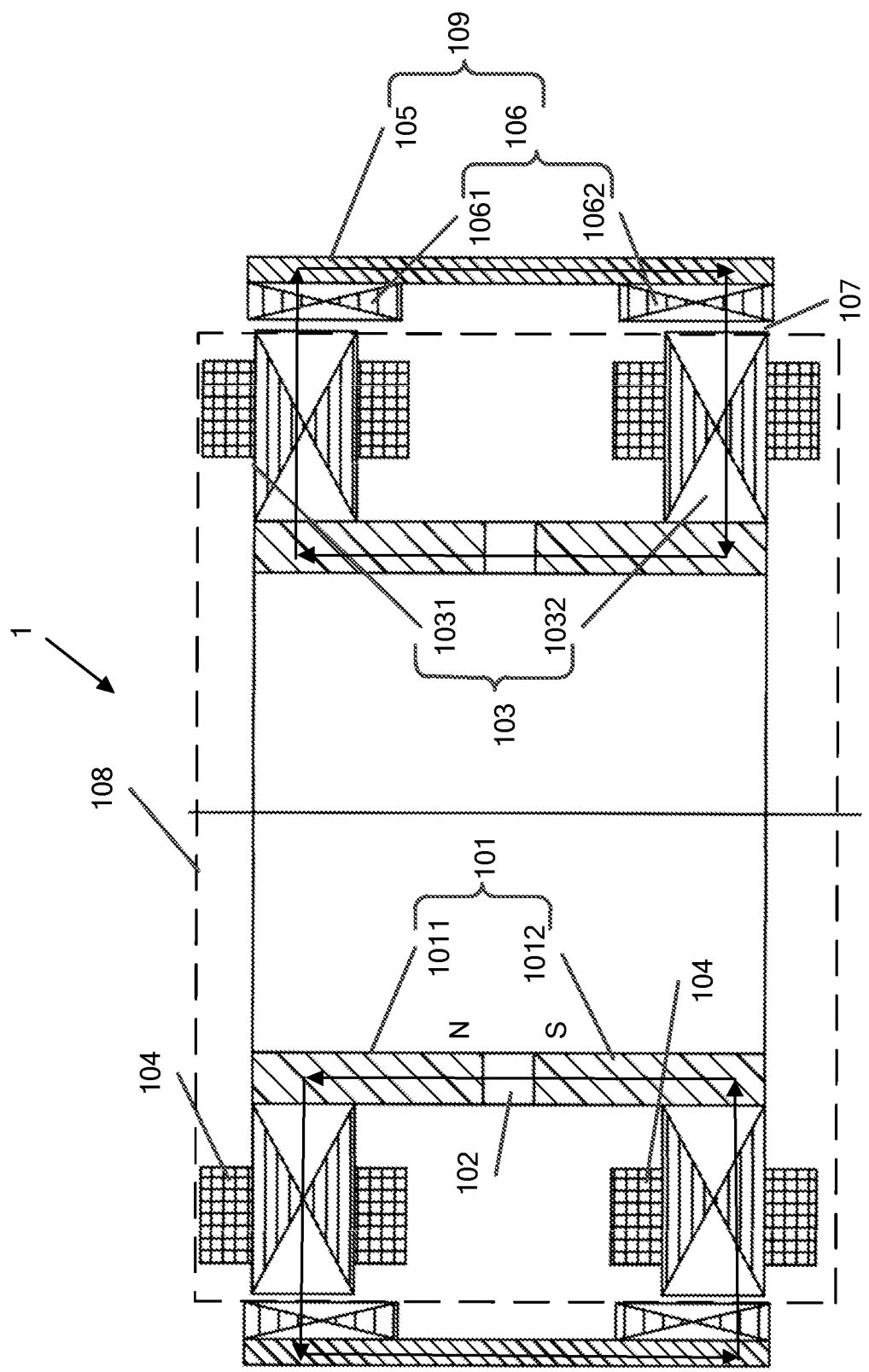
FIG. 2 shows an enlarged schematic diagram of a radial magnetic bearing in FIG. 1 according to various embodiments of the present disclosure.

The control principle of the radial magnetic bearing (1) is: the radial translation of the radial magnetic bearing (1) is controlled by changing coil current of magnetic poles of the stator core (103). The stator permanent magnet generates magnetic field as bias magnetic field of the radial magnetic bearing (1), and the coils (104) generate electromagnetic field to play a role of adjusting strength of magnetic field of magnetic poles of the stator core (103), so that the air gaps between the stator core (103) and the rotor core (106) of the radial magnetic bearing (1) are kept constant, and the rotor core (106) is suspended without mechanical contact. A permanent magnet circuit thereof is: magnetic field lines are from a N pole at an upper part of the stator permanent magnet, then orderly pass through the upper stator magnetic ring (1011), the upper stator core (1031), the air gaps outside the upper stator core (1031), the upper rotor core (1061), the rotor magnetic ring (105), the lower rotor core (1062), the air gaps outside the lower stator core (1032), the lower stator core (1032) and the lower stator magnetic ring (1012), and finally return to an S pole at a lower part of the stator permanent magnet, to form a closed circuit, as shown in FIG. 2.

Figure 3:
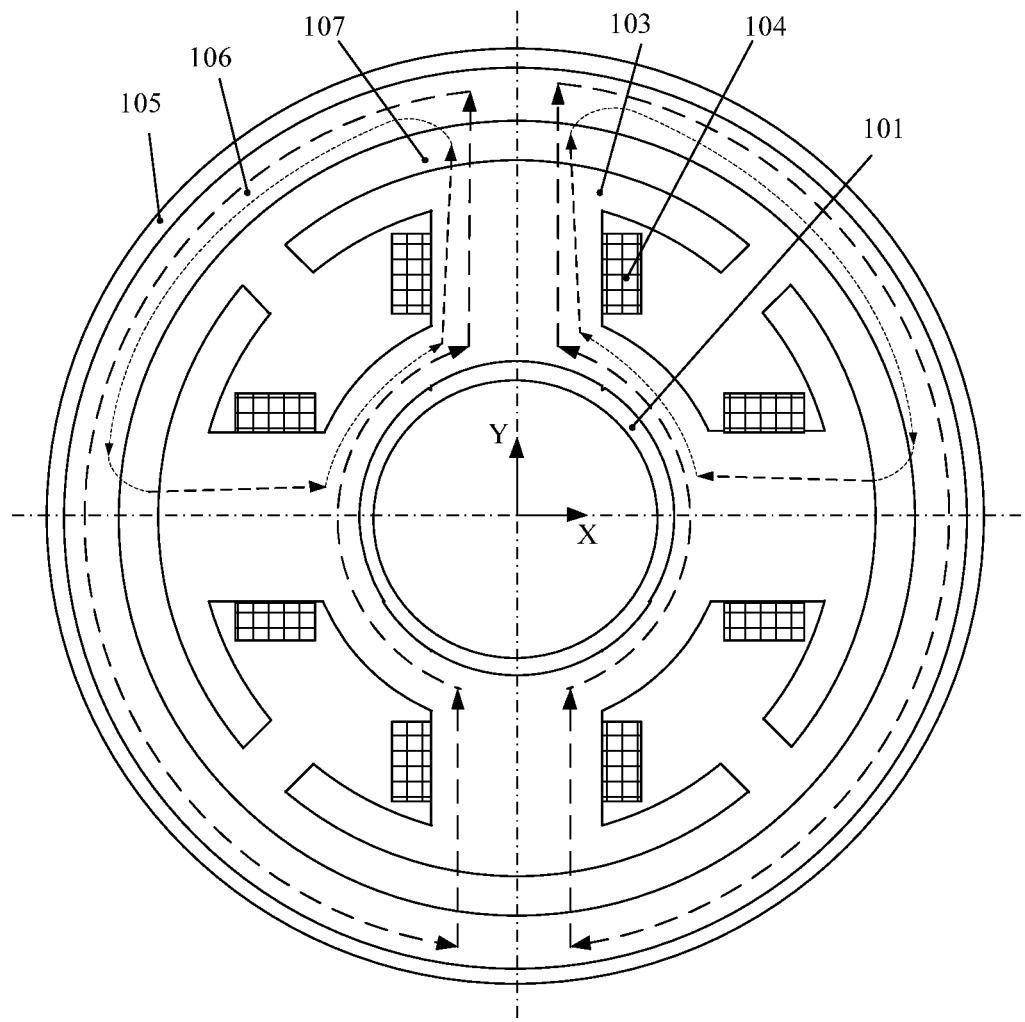
FIG. 3 shows a schematic diagram of a side view of the radial magnetic bearing according to various embodiments of the present disclosure.
Figure 4:
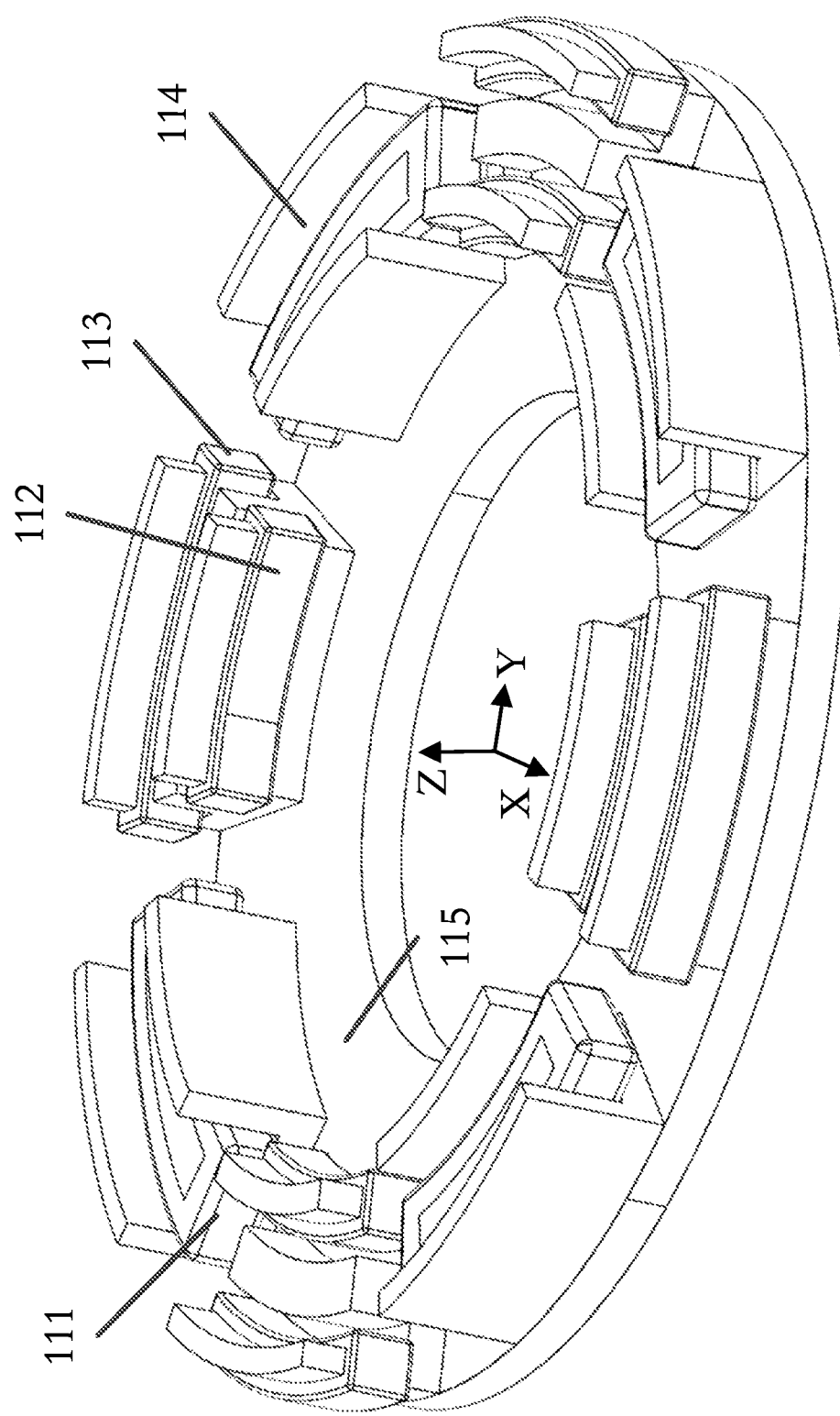
FIG. 4 shows a three-dimensional structure of an axial magnetic bearing according to various embodiments of the present disclosure.

An electromagnetic circuit is (taking the +Y direction as an example): magnetic field lines are from a coil center, i.e., the stator core (103), orderly pass through the air gap in the +Y direction, the rotor core (106), the air gaps in three other directions (+X,-X,-Y), and return to the stator core (103) to form a closed circuit, as shown in FIG. 3. For example, when the wheel body (13) translates in the +Y direction, the stator coil in the +Y direction generates electromagnetic field in the air gap by current, which has the same direction as the bias magnetic field of the stator permanent magnet (102), so that the magnetic field is enhanced, thereby increasing an electromagnetic force. The stator coil in the -Y direction generates electromagnetic field in the air gap in the -Y direction by current, which has the opposite direction as the bias magnetic field of the stator permanent magnet, so that the electromagnetic field is weakened, the electromagnetic force is reduced, and the wheel body (13) is moved towards the -Y direction, and thus, maintained at an equilibrium position.

Figure 5A:
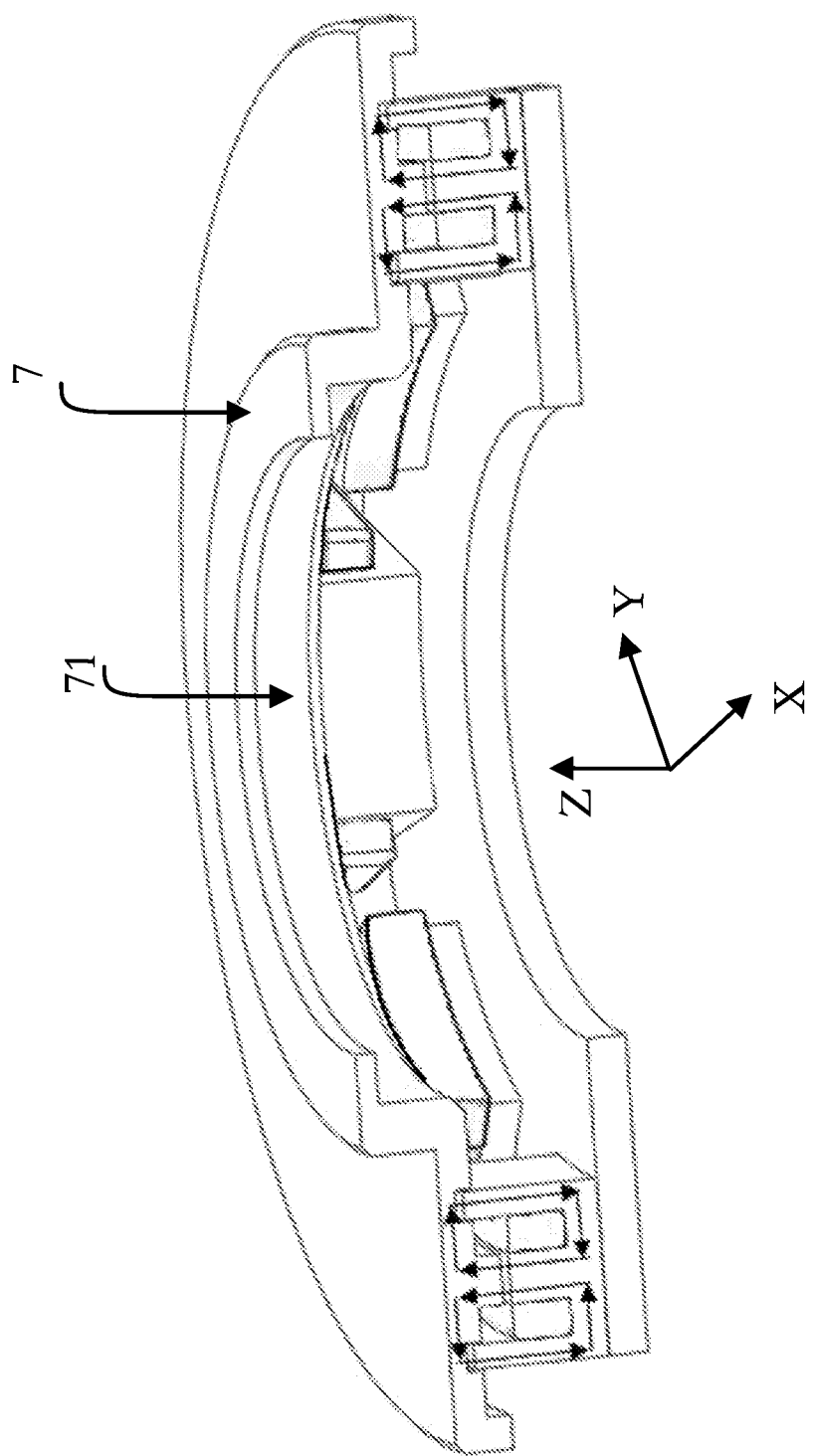
FIG. 5a shows electromagnetic circuits formed by coil current of axial magnetic bearing stator units placed in the upper axial magnetic bearing in ±45° and ±135° directions according to various embodiments of the present disclosure.

The working principle of the axial magnetic bearing of the present disclosure is: firstly, bias current is applied to all coils on the axial magnetic bearing stator units (114) of the upper axial magnetic bearing and the lower axial magnetic bearing, to generate bias magnetic field, and when the wheel body (13) has a radial tilting or an axial translation, the current is applied to the coils to change the electromagnetic force to maintain the stable suspension of the wheel body (13) at a fixed position. The axial magnetic bearing stator units (114) in the ±45° and ±135° directions control the axial translation of the wheel body (13), and the electromagnetic circuit thereof is: magnetic field lines are from the sunken magnetic poles in the middle of one of "E"-shaped stator units, i.e. the second stator magnetic poles, orderly pass through one of the middle air gaps at the upper end of the second stator magnetic poles, an intermediate protrusion part in the "凹"-shaped structure of the upper axial thrust plate (7), two sunken parts at the two sides of the "凹"-shaped structure, and one of the air gaps at the upper end of the first and third stator magnetic poles, and then pass through one of the protruding magnetic poles at two sides of the "E"-shaped stator units, i.e., the first and third stator magnetic poles, and then, return to the coil center, i.e., the sunken magnetic poles in the middle of the "E"-shaped stator units, that is, the second stator magnetic poles, to form a closed circuit, as shown in FIG. 5a. A magnetic circuit formed by the lower axial magnetic bearing along one of the axial magnetic bearing stator units (114) in the ±45 and ±135° directions is the same as a magnetic circuit formed by the upper axial magnetic bearing along one of the axial magnetic bearing stator units (114) in the ±45 and ±135° directions, as shown in FIG. 5b. For example, when the wheel body axially translates along +Z direction, an air gap in the +Z direction is increased, an air gap in −Z direction is reduced, and the current having the same direction with the bias current is applied to one of the middle coils of the second stator magnetic poles of the axial magnetic bearing stator units (114) of the upper axial magnetic bearing (3) in the ±45 and ±135° directions to increase the electromagnetic force; and the current having the opposite direction with the bias current is applied to one of the middle coils of the second stator magnetic poles of the axial magnetic bearing stator units (114) of the lower axial magnetic bearing (4) in the ±45 and ±135° directions, to weaken the electromagnetic force, so that the wheel body is adjusted to the equilibrium position. When the rotor axially translates along the −Z direction, the action principle is similar to that when translating along the +Z direction.

When the wheel body is tilted in the radial direction, the axial magnetic bearing stator units (114) of the upper axial magnetic bearing (3), which are placed in the ±X and ±Y directions, are used in combination with the axial magnetic bearing stator units (114) of the lower axial magnetic bearing (4), which are placed in the ±X and ±Y directions, and magnetic field is generated through the outer coil current and the inner coil current, thereby independently changing the current value of each coil and the electromagnetic force, and realizing the radial tilting motion of the wheel body.

Figure 6A:
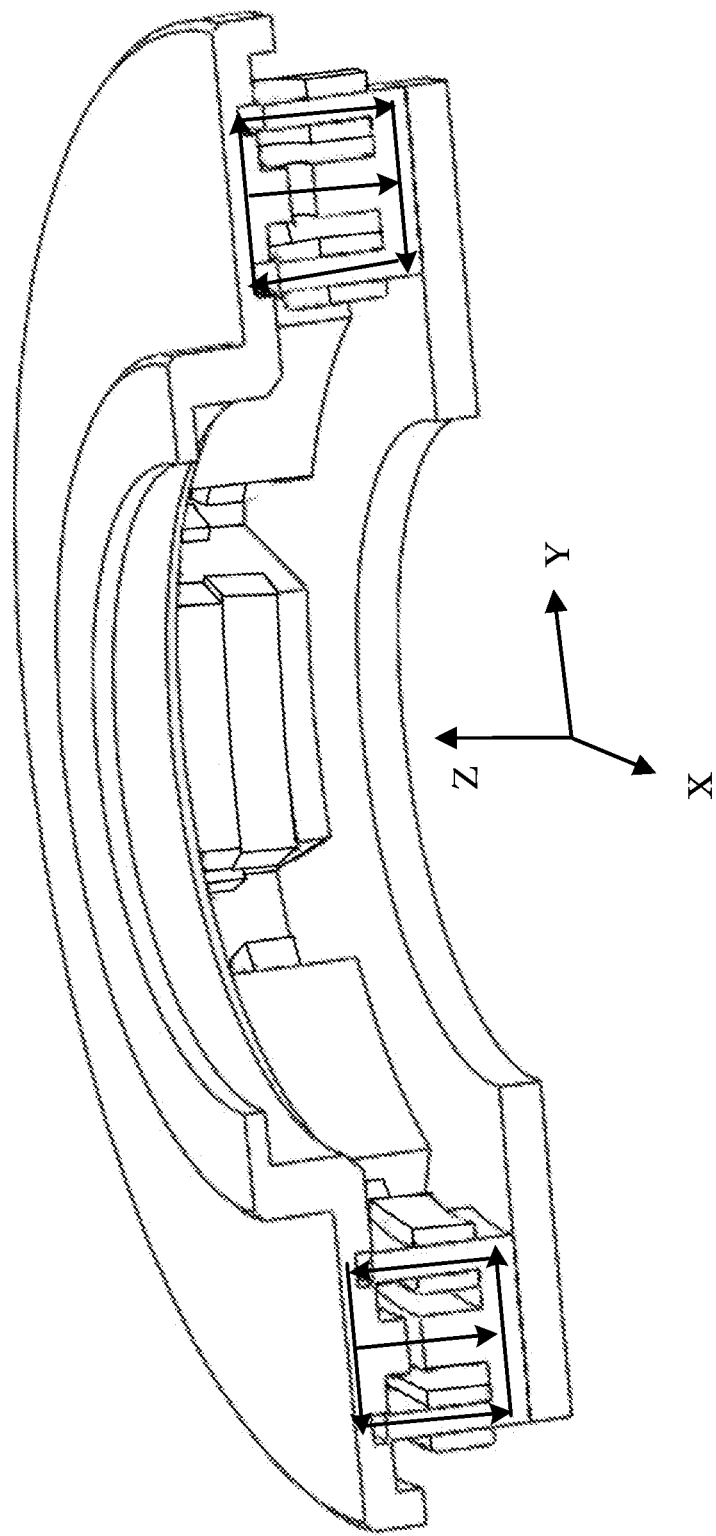
FIG. 6a shows electromagnetic circuits formed by inner coil current of the axial magnetic bearing stator units placed in the upper axial magnetic bearing in the ±X and ±Y directions according to various embodiments of the present disclosure.

As shown in FIG. 6a, an electromagnetic circuit formed by inner coil current is: a first part of magnetic field lines is from a center of one inner coil, i.e., one protruding magnetic pole inside one "E"-shaped stator, that is, a center of one first stator magnetic pole, and then, pass through air gap at the upper end of inner side of the "E"-shaped stator, a sunken part inside a "凵"-shaped structure of the upper axial thrust plate (7), a protruding part in the middle of the "凵"-shaped structure, the air gap at the upper end in the middle of the "凵"-shaped structure, the sunken magnetic pole in the middle of the "E"-shaped stator, i.e., the second stator magnetic pole, and then return to the center of the inner coil, to form a closed circuit.

As shown in FIG. 6a, a second part of magnetic field lines is from the center of the above inner coil, i.e., the protruding magnetic pole inside that "E"-shaped stator, that is, the center of the first stator magnetic pole, the air gap at the upper end inside the "E"-shaped stator, the sunken part inside the "凵"-shaped structure of the upper axial thrust plate (7), the sunken part outside the "凵"-shaped structure, and the air gap at the upper end outside the "E"-shaped stator, and the protruding magnetic pole outside the "E"-shaped stator, i.e., the third stator magnetic pole, finally return to the center of the inner coil to form a closed circuit.

Figure 6B:
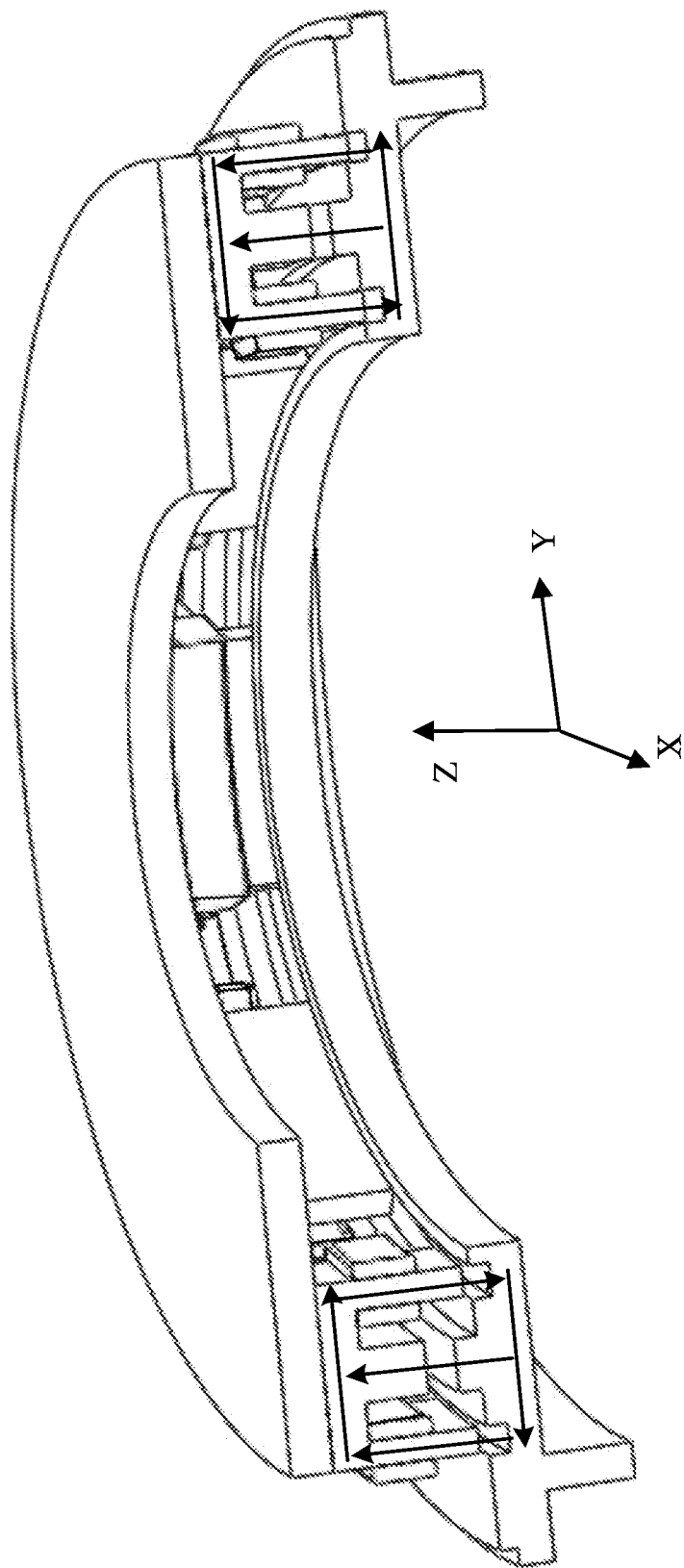
FIG. 6b shows electromagnetic circuits formed by inner coil current of the axial magnetic bearing stator units placed in the lower axial magnetic bearing in the ±X and ±Y directions according to various embodiments of the present disclosure.

A magnetic circuit formed by the lower axial magnetic bearing along one of the axial magnetic bearing stator units in the ±X and ±Y directions is the same as the magnetic circuit formed by the upper axial magnetic bearing along one of the axial magnetic bearing stator units in the ±X and ±Y directions, as shown in FIG. 6b.

Figure 7A:
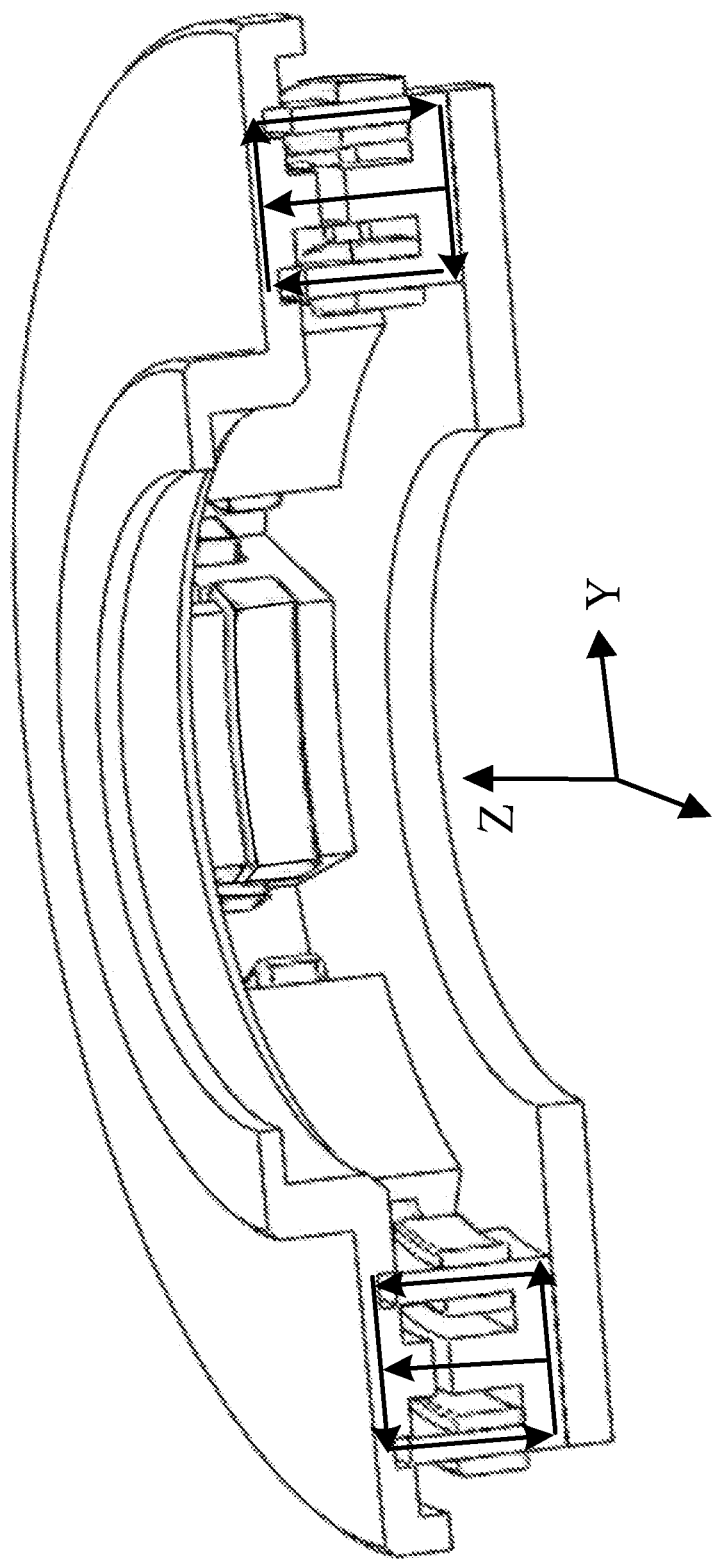
FIG. 7a shows electromagnetic circuits formed by outer coils of the axial magnetic bearing stator units placed in the upper axial magnetic bearing in the ±X and ±Y directions work independently, or formed by the inner and the outer coils of the axial magnetic bearing stator units placed in the upper axial magnetic bearing in the ±X and ±Y directions work at the same time according to various embodiments of the present disclosure.

As shown in FIG. 7a, the electromagnetic circuit formed by the outer coil current is: a first part of magnetic field lines is from a center of one outer coil, i.e., the protruding magnetic pole outside one "E"-shaped stator, that is, one third stator magnetic pole, then pass through the sunken magnetic pole in the middle of the "E"-shaped stator, that is, a second stator magnetic pole, the air gap in the middle of the upper end of the "E"-shaped stator, the protruding part in the middle of the "凵"-shaped structure of the upper axial thrust plate (7), the sunken part outside the "凵"-shaped structure, the air gap outside the upper end of the outer coil, and the protruding magnetic pole outside the "E"-shaped stator, i.e., the third stator magnetic pole, and then return to the center of the outer coil, to form a closed circuit.

As shown in FIG. 7a, a second part of the magnetic field lines is from the center of the above outer coil, i.e., the protruding magnetic pole outside the "E"-shaped stator, i.e., the third stator magnetic pole, then pass through the protruding magnetic pole inside the "E"-shaped stator, i.e., the first stator magnetic pole, the air gap inside the upper end of the "E"-shaped stator, the sunken part inside the "凵"-shaped structure of the upper axial thrust plate (7), the sunken part outside the "凵"-shaped structure, the air gap outside the upper end, the third stator magnetic pole, and then return to the center of the one outer coil, to form a closed circuit.

Figure 7B:
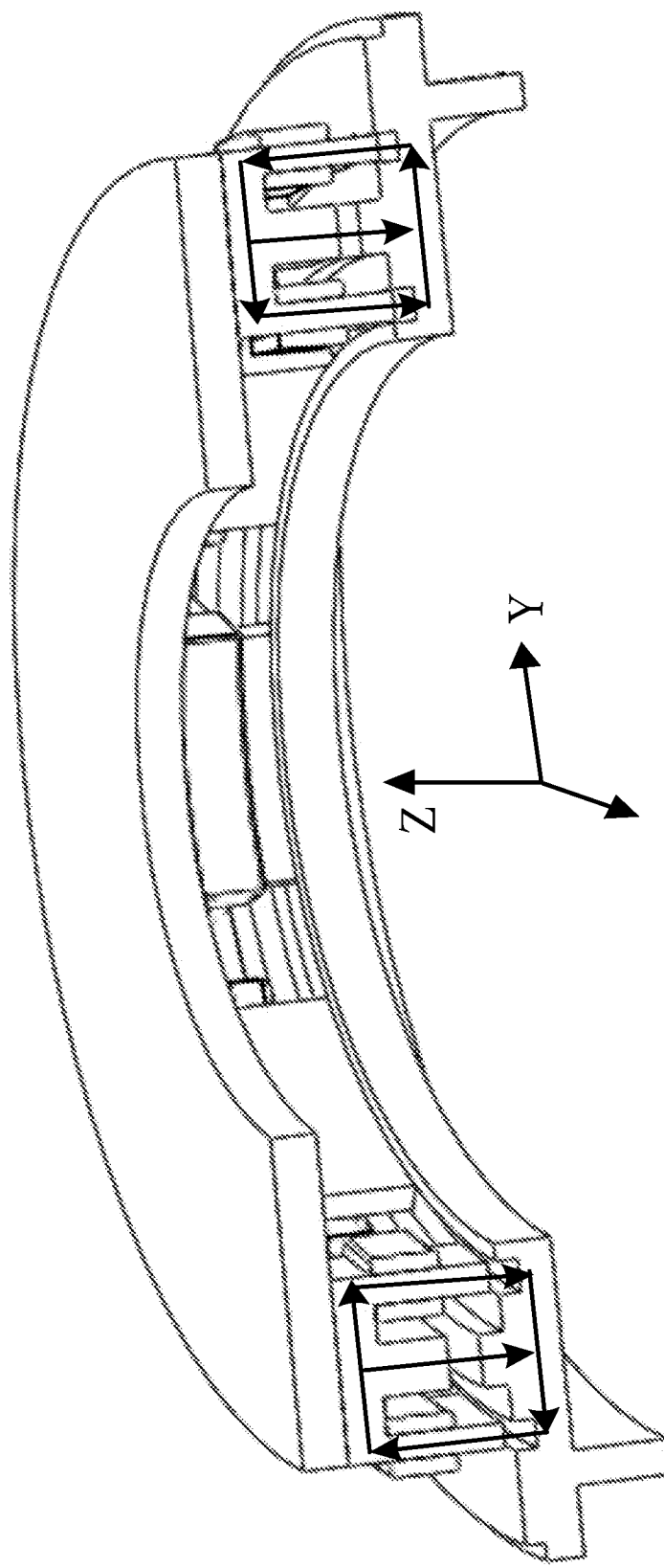
FIG. 7b shows electromagnetic circuits formed by the outer coils of the axial magnetic bearing stator units placed in the lower axial magnetic bearing in the ±X and ±Y directions work independently, or formed by the inner and the outer coils of the axial magnetic bearing stator units placed in the lower axial magnetic bearing in the ±X and ±Y directions work at the same time according to various embodiments of the present disclosure.

A magnetic circuit formed by one of the axial magnetic bearing stator units in the ±X and ±Y directions of the lower axial magnetic bearing (4) is the same as the magnetic circuit formed by one of the axial magnetic bearing stator units in the ±X and ±Y directions of the upper axial magnetic bearing (3), as shown in FIG. 7b.

When the inner and the outer coils work at the same time, magnetic circuit is jointly formed by magnetic field lines formed by the inner and the outer coil current. The magnetic field lines formed by the inner and the outer coil current have the same direction at the outside air gaps and the inside air gaps and are overlapped to each other, and have opposite directions at the middle air gaps and counteracts each other. In general, each of the outer coils wound by the third stator magnetic poles and each of the inner coils wound by the first stator magnetic poles have the same bias current, but have the opposite direction, to generate magnetic field in the same direction. When designing, turns of the outer coils wound by the third stator magnetic poles are usually greater than those of the inner coils wound by the first stator magnetic poles, so that the magnetic field lines generated at the middle air gaps, when the inner and the outer coils work at the same time and counteract each other, have the same direction as those when the outer coils work independently, therefore, a diagram of the magnetic circuit when the inner and the outer coils work at the same time is the same as that when the outer coils work independently. The magnetic circuit formed by the upper axial magnetic bearing (3) along the axial magnetic bearing stator units in the ±X and ±Y directions is as shown in FIG. 7a, and the magnetic circuit formed by the lower axial magnetic bearing (4) along the axial magnetic bearing stator units in the ±X and ±Y directions is as shown in FIG. 7b, but the magnetic field lines among the air gaps are different from those when the outer coils work independently.

For example, when the gimbal controls the flywheel system to rotate at a small angular speed so that the wheel body tilts around Y axis at a small angle) (0~0.8°), the air gap at the upper end of the wheel body in the +X is increased and the air gap in the −X direction is reduced, the air gap at the lower end of the wheel body in the +X direction is reduced and the air gap in the −X direction is increased. The current having the same direction with the bias current is applied to the inner coil wound by the first stator magnetic pole of the axial magnetic bearing stator unit of the upper axial magnetic bearing in the +X direction, so that the electromagnetic force is increased; the current having the opposite direction with the bias current is applied to the inner coil wound by the first stator magnetic pole of the axial magnetic bearing stator unit placed in the −X direction, so that the electromagnetic force is reduced; the current having the opposite direction with the bias current is applied to the inner coil wound by the first stator magnetic pole of the axial magnetic bearing stator unit of the lower axial magnetic bearing in the +X direction, so that the electromagnetic force is reduced; and the current having the same direction with the bias current is applied to the inner coil wound by the first stator magnetic pole of the axial magnetic bearing stator unit placed in the −X direction, so that the electromagnetic force is increased. The upper and the lower axial magnetic bearings cooperate to control the electromagnetic force, generate a moment in −Y axis, and maintain the wheel body balance. When the gimbal controls the housing to rotate at a big angular speed so that the wheel body tilts around the Y axis at a big angle (0.8~1.6°, the current having the same direction with the bias current is simultaneously applied to the inner coil wound by the first stator magnetic pole of the axial magnetic bearing stator unit of the upper axial magnetic bearing in the +X direction and the outer coil wound by the third stator magnetic pole in the +X direction, so that the electromagnetic force is increased; the current having the opposite direction with the bias current is simultaneously applied to the inner coil wound by the first stator magnetic pole of the axial magnetic bearing stator unit placed in the −X direction and the outer coil wound by the third stator magnetic pole in the −X direction, so that the electromagnetic force is decreased; the current having the opposite direction with the bias current is simultaneously applied to the inner coil wound by the first stator magnetic pole of the axial magnetic bearing stator unit placed in the lower axial magnetic bearing in the +X direction and the outer coil wound by the third stator magnetic pole in the +X direction, so that the electromagnetic force is decreased; and the current having the same direction with the bias current is simultaneously applied to the inner coil wound by the first stator magnetic pole of the axial magnetic bearing stator unit placed in the −X direction and the outer coil wound by the third stator magnetic pole in the −X direction, so that the electromagnetic force is increased, thereby generating a moment in the −Y axis, and making the wheel body balance.

Compared with the existing art, the present disclosure has advantages that: the present disclosure realizes the control of two radial translations of the single-gimbal MSCMG with the radial magnetic bearing, and jointly realizes the control of two radial tilting motions and one axial translation with two axial magnetic bearings. Each axial magnetic bearing of the present disclosure has an "E"-shaped stator structure, and is designed with three magnetic poles, thereby improving the space utilization and improving the magnetic bearing capacity of the magnetic bearing and the control ability of the radial tilting motion. In eight groups of "E"-shaped stators of the present disclosure, four groups of "E"-shaped stators placed in the ±X and ±Y directions control the radial tilting motions of wheel body, and the other four groups of "E"-shaped stators placed in ±45° and ±135° directions control the axial translation of the wheel body, which could greatly reduce the volume and weight of the structure of the magnetic bearing. In addition, the diameter of the upper protective bearing of the present disclosure is less than that of the lower protective bearing, thereby being more convenient for installing and dismantling the wheel body inside the single-gimbal MSCMG.

Based on the above, various embodiments of the present disclosure also propose a MSCMG, including:
  a gimbal (17);
  a flywheel system, set in the gimbal (17);
  wherein the flywheel system includes:
    a housing (14);
    a shaft (2), arranged in the inner cavity of the housing (14);
    a radial magnetic bearing (1), including: a first rotor portion (109) and a first stator portion (108) fixed to the shaft (2);
    an upper axial magnetic bearing (3) and a lower axial magnetic bearing (4), wherein the upper axial magnetic bearing (3) is fixed to an upper end of the first stator portion (108), the lower axial magnetic bearing (4) is fixed to a lower end of the first stator portion (108);
    a wheel body (13), set in the radial magnetic bearing (1), fixed to the first rotor portion (109); and
    an upper axial thrust plate (7) and a lower axial thrust plate (8), wherein the upper axial thrust plate (7) is fixed to an upper end of the wheel body (13), and is on an upper end of the upper axial magnetic bearing (3), the lower axial thrust plate (8) is fixed to the lower end of the wheel body (13), and is under a lower end of the lower axial magnetic bearing (4).

In various embodiments, the wheel body (13) is suspended in an axial direction between the upper axial magnetic bearing (3) and the lower axial magnetic bearing (4), when the upper axial magnetic bearing (3) attracts the upper axial thrust plate (7) and the lower axial magnetic bearing (4) attracts the lower axial thrust plate (8).

In various embodiments, the flywheel system further includes:
  an integrated displacement sensor for radial and axial directions (9), arranged outside the upper axial thrust plate (7), wherein there are axial detection gaps and radial detection gaps between axial probes of the integrated displacement sensor for radial and axial directions (9) and the upper axial thrust plate (7); and
  a radial displacement sensor (10), arranged outside the lower axial thrust plate (8), wherein there are radial detection gaps between the radial displacement sensor (10) and the lower axial thrust plate (8).

In various embodiments, the upper axial thrust plate (7) and the lower axial thrust plate (8) are respectively provided with a stepped hole; the flywheel system further includes:
  an upper protective bearing (5), set in the shaft (2), and in the stepped hole (71) of the upper axial thrust plate (7), wherein there are radial protective gaps and an axial protective gaps between the upper protective bearing (5) and the stepped hole (71) of the upper axial thrust plate (7); and
  a lower protective bearing (6), set in the draft (2) and in the stepped hole (81) of the lower axial thrust plate (8), wherein there are radial protective gaps and axial protective gaps between the lower protective bearing (6) and the stepped hole (81) of the lower axial thrust plate (8).

In various embodiments, the radial protective gaps are between a large hole side wall of the stepped hole (71) of the upper axial thrust plate (7) and the upper protective bearing (5); the axial protective gaps are between bottom of the large hole and the upper protective bearing (5).

Similarly, there are radial protective gaps between the lower protective bearing (6) and a large hole side wall of the stepped hole (81) of the lower axial thrust plate (8). Axial protective gaps are between the lower protective bearing (6) and the bottom of the large hole of the stepped hole (81) of the lower axial thrust plate (8).

Here, the upper protective bearing (5) and the lower protective bearing (6) can protect the radial magnetic bearing (1). Specifically, the upper protective bearing (5) and the lower protective bearing (6) can limit the first rotor portion (109) of the radial magnetic bearing (1), to prevent the first rotor portion (109) and the first stator portion (108) from coming into contact.

In various embodiments, the radial displacement sensor (10) is configured to detect a radial displacement of the lower end of the wheel body (13); the integrated displacement sensor for radial and axial directions (9) includes:

four radial probes (302, 304, 306, 308), arranged orthogonally for detecting a radial displacement of the upper end of the wheel body (13); and four axial probes (301, 303, 305, 307), arranged orthogonally for detecting an axial displacement of the upper end of the wheel body (13).

In various embodiments, the flywheel system further includes:

a base (11), engaged with the housing (14) to close the inner cavity of the housing (14); and a high-speed motor (12), arranged on the base (11), and is for driving the wheel body (13) to rotate.

In various embodiments, the high-speed motor (12) includes:

a second stator portion, fixed to the base (11) by a connecting plate;

an outer rotor core, outside the second stator portion, and fixed to the wheel body (13); and an inner rotor core, inside the second stator portion, and fixed to the wheel body (13).

In various embodiments, the first stator portion (108) of the radial magnetic bearing (1) includes:

an upper stator magnetic ring (1011);

a lower stator magnetic ring (1012);

a stator permanent magnet (102), between the upper stator magnetic ring (1011) and the lower stator magnetic ring (1012);

an upper stator core (1031), outside the upper stator magnetic ring (1011), and including four magnetic poles distributed in ±X and ±Y directions, and each of the four magnetic poles is with a coil (104); and a lower stator core (1032), outside the lower stator magnetic ring (1012), and including four magnetic poles distributed in ±X and ±Y directions, and each of the four magnetic poles is with a coil (104).

The first rotor portion (109) of the radial magnetic bearing (1) includes:

a rotor magnetic ring (105);

an upper rotor core (1061), outside the upper stator core (1031), and fixed on an inner wall of the rotor magnetic ring (105), there are air gaps between the upper stator core (1031) and the upper rotor core (1061); and a lower rotor core (1062), outside the lower stator core (1032), and fixed on an inner wall of the rotor magnetic ring (105), there are air gaps between the lower stator core (1032) and the lower rotor core (1062).

In various embodiments, the radial magnetic bearing (1) further includes: a first controller, configured to: when the wheel body (13) is radially translated, adjust the wheel body (13) to an equilibrium position in the radial direction by controlling the current in the coils (104).

In various embodiments, wherein when the wheel body (13) is radially translated, for the magnetic poles in the upper stator core (1031) and in the lower stator core (1032), the first controller is further configured to: increase the current in the coil (104) on one of the magnetic poles in the upper stator core (1031) and in the lower stator core (1032), when an air gap between that magnetic pole and the first rotor portion (109) is larger than an air gap corresponding to the equilibrium position, and decrease the current in the coil (104) on that magnetic pole, when the air gap between that magnetic pole and the first rotor portion (109) is smaller than the air gap corresponding to the equilibrium position.

In various embodiments, each of the upper axial magnetic bearing (3) and the lower axial magnetic bearing (4) includes eight axial magnetic bearing stator units (114), the eight axial magnetic bearing stator units (114) are respectively distributed in the ±X, ±Y, ±45° and ±135° directions; wherein each of the eight axial magnetic bearing stator units (114) is provided with a slot having an E-shaped cross section, and each of the eight axial magnetic bearing stator units (114) includes the following at the slot:

a second stator magnetic pole, a first stator magnetic pole radially inward of the second stator magnetic pole, and a third stator magnetic pole radially outward of the second stator magnetic pole;

wherein protrusions of the first stator magnetic pole and the third stator magnetic pole are higher than a protrusion of the second stator magnetic pole;

in each of the axial magnetic bearing stator units (114) in the ±X, ±Y direction, the first stator magnetic pole is provided with an inner coil (112), and the third stator magnetic pole is provided with an outer coil (113); in each of the axial magnetic bearing stator units (114) in the ±45° and ±135° directions, the second stator magnetic pole is provided with a middle coil (111).

The upper axial thrust plate (7) and the lower axial thrust plate (8) respectively includes an annular groove, an opening direction of the annular groove of the upper axial thrust plate (7) is opposite to an installation direction of the annular groove of the lower axial thrust plate (8); the annular groove has a " " shape in cross section, and the annular groove includes: a central protrusion, an inner side depression on a radially inner side of a middle protrusion, and an outer side depression on a radially outer side of the middle protrusion; wherein the first stator magnetic pole of each of the axial magnetic bearing stator units (114) is aligned with the inner side depression and forms an inner air gap, the second stator magnetic pole of each of the axial magnetic bearing stator units (114) is aligned with the middle protrusion and forms a middle air gap, the third stator magnetic pole is aligned with the outer side depression and forms an outer air gap.

In various embodiments, the MSCMG further includes a second controller, configured to: control the current in the middle coil (111), the current in the inner coil (112), and the current in the outer coil (113) when the wheel body (13) is radially tilted or axially translated, such that the wheel body (13) is adjusted to an equilibrium position.

In various embodiments, wherein when the wheel body (13) is axially translated, for the second stator magnetic pole of any one of the axial magnetic bearing stator units (114) in ±45° and ±135° directions, the second controller is further configured to: increase current in the middle coil (111) on the second stator magnetic pole of that axial magnetic bearing stator unit (114) when a middle air gap on that axial magnetic bearing stator unit (114) becomes larger than a middle air gap corresponding to the equilibrium position, and reduce the current in the middle coil (111) on the second stator magnetic pole of that axial magnetic bearing stator unit (114); when the middle air gap on that axial magnetic bearing stator unit (114) becomes smaller than the middle air gap corresponding to the equilibrium position; when the wheel body (13) is radially tilted, for any one of the axial magnetic bearing stator units (114) in ±X and ±Y directions, the second controller is further configured to: enhance an electromagnetic force by the inner coil (112) and the outer coil (113) of that axial magnetic bearing stator unit (114), when air gaps of that axial magnetic bearing stator units (114) become larger than air gaps corresponding to the equilibrium position, and reduce the electromagnetic force by the inner coil (112) and the outer coil (113) of the first and third stator magnetic pole of that axial magnetic bearing stator unit (114), when the air gaps of that axial magnetic bearing stator unit (114) become smaller than the air gap corresponding to the equilibrium position.

Here, when the wheel body (13) is radially tilted or radially translated, the middle air gap is larger than the middle air gap corresponding to the equilibrium position means that the middle air gap exceeds a middle magnetic gap length corresponding to the equilibrium position. The air gaps of that axial magnetic bearing stator unit (114) contain an inside air gap, an outside air gap and a middle air gap between that axial magnetic bearing stator unit (114) and the upper axial thrust plate (7), or the lower axial thrust plate (8).

In various embodiments, the MSCMG further includes:
a gimbal shaft (15), having a right end fixed to the housing (14), a middle portion of the gimbal shaft (15) is mounted to a left end of the gimbal (17) by the mechanical bearings (16);
a gimbal motor shaft (19), mounted to the right end of the gimbal (17) by mechanical bearings, a left end of the gimbal motor shaft (19) is fixed to the housing (14); and
a gimbal motor (18), driving the gimbal motor shaft (19) to rotate.

In various embodiments, the MSCMG further includes:
a conductive slip ring (21), including: a third rotor portion and a third stator portion, wherein the third rotor portion is fixed to a left end of the gimbal shaft (15), and the third stator portion is fixed to the gimbal (17); and
an angular position sensor (20), including: a fourth rotor portion and a fourth stator portion, wherein the fourth rotor portion is fixed to the left end of the gimbal shaft (15), and the fourth stator portion is fixed to the gimbal (17).

In various embodiments, wherein the gimbal motor (18) includes:
a fifth rotor portion, fixed to a right end of the gimbal motor shaft (19); and
a fifth stator portion, fixed to the right end of the gimbal (17).

In various embodiments, the angular position sensor (20) is a rotary transformer or a photoelectric encoder.

In view of the above, embodiments of the present disclosure provide a five DOFs single-gimbal MSCMG, so as to improve the energy density, reduce the volume and power consumption and improve the ability to output the moment by controlling two radial tilting motions by two axial magnetic bearings.

As shown in FIG. 1, a five DOFs single-gimbal MSCMG includes: a radial magnetic bearing (1), a shaft (2), an upper axial magnetic bearing (3), a lower axial magnetic bearing (4), an upper protective bearing (5), a lower protective bearing (6), an upper axial thrust plate (7), a lower axial thrust plate (8), an integrated displacement sensor for radial and axial directions (9), a radial displacement sensor (10), a base (11), a high-speed motor (12), a wheel body (13), a housing (14), a gimbal shaft (15), mechanical bearings (16), a gimbal (17), a gimbal motor (18), a gimbal motor shaft (19), an angular position sensor (20) and a conductive slip ring (21).

The radial magnetic bearing (1) is located in a middle part of the housing (14), and the first rotor portion (109) of the radial magnetic bearing (1) are nested on the shaft (2), which is located in the center of the housing (14).

The upper axial magnetic bearing (3) and the lower axial magnetic bearing (4) are respectively on the upper end of the first rotor portion (109) of the radial magnetic bearing (1) and under the lower end of the first rotor portion (109) of the radial magnetic bearing (1), they respectively consists of eight axial magnetic bearing stator units (114), and are fixed to the shaft (2), wherein each axial magnetic bearing stator unit (114) is "E"-shaped.

The upper protective bearing (5) is on the upper end of the upper axial magnetic bearing (3), the lower protective bearing (6) is under the lower end of the lower axial magnetic bearing (4), and the upper protective bearing (5) and the lower protective bearing (6) are also fixed to the shaft (2).

The upper axial thrust plate (7) is arranged outside the upper protective bearing (5) in radial direction, a "凹"-shaped groove is located on the upper axial thrust plate (7), the lower axial thrust plate (8) is arranged outside a radial direction of the lower protective bearing (6), a "凹"-shaped groove is located on the lower axial thrust plate (8), radial protective gaps and axial protective gaps are formed between the upper protective bearing (5) and the upper axial thrust plate (7), and radial protective gaps and axial protective gaps are formed between the lower protective bearing (6) and the lower axial thrust plate (8).

The integrated displacement sensor for radial and axial directions (9) is arranged outside the upper axial thrust plate (7) in radial direction, and the radial displacement sensor (10) is arranged outside the lower axial thrust plate (8) in radial direction, wherein radial detection gaps are formed between the upper axial thrust plate (7) and a radial probe of the integrated displacement sensor for radial and axial directions (9), axial detection gaps are formed between the upper axial thrust plate (7) and an axial probe of the integrated displacement sensor for radial and axial directions (9), the integrated displacement sensor for radial and axial directions (9) is fixedly connected with the shaft (2) through a sensor base, radial detection gaps are formed among the lower axial thrust plate (8) and probes of the radial displacement sensor (10), and the radial displacement sensor (10) is fixedly connected with the base (11) through the sensor base.

A second stator portion of the high-speed motor (12) is fixedly connected with the base (11) through a connecting plate, an outer rotor core of the high-speed motor (12) is arranged outside the stator part of the high-speed motor (12), an inner rotor core is arranged inside the second stator portion of the high-speed motor (12), the outer rotor core and the inner rotor core are installed at a lower part of the wheel body (13), and an inside air gap and an outside air gap are respectively formed among the stator part of the high-speed motor (12) and the inner rotor core and the outer rotor core.

An inner side of the wheel body (13) is fixedly connected with the first rotor portion (109) of the radial magnetic bearing (1) through an interference fit, and the housing (14) is outside the wheel body (13) and connected with the base (11) through screws to seal the wheel body.

A right end of the gimbal shaft (15) is connected with a groove of the housing (14), a middle part of the gimbal shaft (15) is connected with the gimbal (17) through the mechanical bearings (16), the fifth stator portion of the gimbal motor (18) is connected with a right end of the gimbal (17) through an interference fit, the fifth rotor portion of the gimbal motor (18) is connected with a right end of the gimbal motor shaft (19), a left end of the gimbal motor shaft (19) is connected with the housing (14), the fourth stator portion of the angular position sensor (20) is connected with a left end of the gimbal (17) and also connected with the third stator portion of the conductive slip ring (21), and the fourth rotor portion of the angular position sensor (20) and the third rotor portion of the conductive slip ring (21) are fixedly connected with the gimbal shaft (15).

The radial magnetic bearing (1) includes a stator magnetic ring (101), a stator permanent magnet (102), stator cores (103), coils (104), a rotor magnetic ring (105), rotor cores (106) and air gaps (107).

The stator magnetic ring (101) includes an upper stator magnetic ring (1011) and a lower stator magnetic ring (1012). The stator permanent magnet (102) is located between the upper stator magnetic ring (1011) and the lower stator magnetic ring (1012), and the stator magnetic ring (101) is located inside the stator cores (103) in radial direction.

The stator core (103) includes an upper stator core (1031) and a lower stator core (1032). The upper stator core (1031) and the lower stator core (1032) respectively includes four magnetic poles in ±X and ±Y directions, the upper stator core (1031) and the lower stator core (1032) form eight magnetic poles at the upper and the lower ends of the radial magnetic bearing (1), and the coils (104) are wound on the magnetic poles of each stator core (103).

The rotor core (106) is located outside the stator core (103), the air gaps (107) are among the magnetic poles of the rotor core (106) and an external surface of the stator core (103), and the rotor magnetic ring (105) is arranged at the exterior of the rotor core (106).

The upper axial magnetic bearing (3) consists of eight axial magnetic bearing stator units (114), each axial magnetic bearing stator unit (114) consists of three stator magnetic poles, wherein a first stator magnetic pole is a protruding magnetic pole inside the axial magnetic bearing stator unit (114), a second stator magnetic pole is a magnetic pole in the middle of the axial magnetic bearing stator unit (114), and a third stator magnetic pole is a protruding magnetic pole outside the axial magnetic bearing stator unit (114). The three stator magnetic poles form an inside air gap, a middle air gap and an outside air gap respectively with an inner side depression, a middle protrusion and an outer side depression of a "凹"-shaped structure of the upper axial thrust plate (7). The axial magnetic bearing stator units (114) are "E"-shaped, and are respectively arranged on an upper axial magnetic bearing adapter plate (115) in ±X, ±Y, ±45° and ±135° directions.

The inner coils (112) are wound on the first stator magnetic poles of the axial magnetic bearing stator units (114) placed in the ±X and ±Y directions, the outer coils (113) are wound on the third stator magnetic poles of the axial magnetic bearing stator units (114) placed in the ±X and ±Y directions, and the middle coils (111) are wound on the second stator magnetic poles of the axial magnetic bearing stator units (114) in the ±45° and ±135° directions.

The integrated displacement sensor for radial and axial directions (9) has four orthogonally placed radial probes and four orthogonally placed axial probes, wherein the radial probes complete detection of two radial translational generalized displacement of the wheel body (13). The axial probes complete detection of three displacements including the axial translation of the wheel body (13), a radial tilting around −X axis and a radial tilting around −Y axis.

The angular position sensor (20) may be a rotary transformer, or a photoelectric encoder.

The stator magnetic ring (101) and the rotor magnetic ring (105) used in the technical solution of the present disclosure have solid structures made from materials with good permeability, such as electrical pure iron, such as DT4, all kinds of carbon steels, cast iron, cast steel, alloy steel, 1J50 and 1J79. The stator cores (103) and the rotor core (106) are laminated by materials with good magnetic permeability, such as DT4, electrical silicon steel sheet DR510, DR470, DW350, 1J50 and 1J79. The stator permanent magnet (102) is made from materials with good magnetic property, such as rare earth permanent magnet, Nd—Fe—B permanent magnet or ferrite permanent magnet. The stator permanent magnet (102) is an axial ring, and magnetized in an axial direction. The middle coils (111), the inner coils (112), the outer coils (113) and the coils (104) are prepared around the electromagnetic wire with good permeability, dip coating and drying. The magnetic pole of the core (103) should be in a pole-shoe form (as shown in FIG. 3) to reduce eddy-current loss arising from the change in magnetic field of the rotor core at the high rotation of the wheel body.

Figure 8:
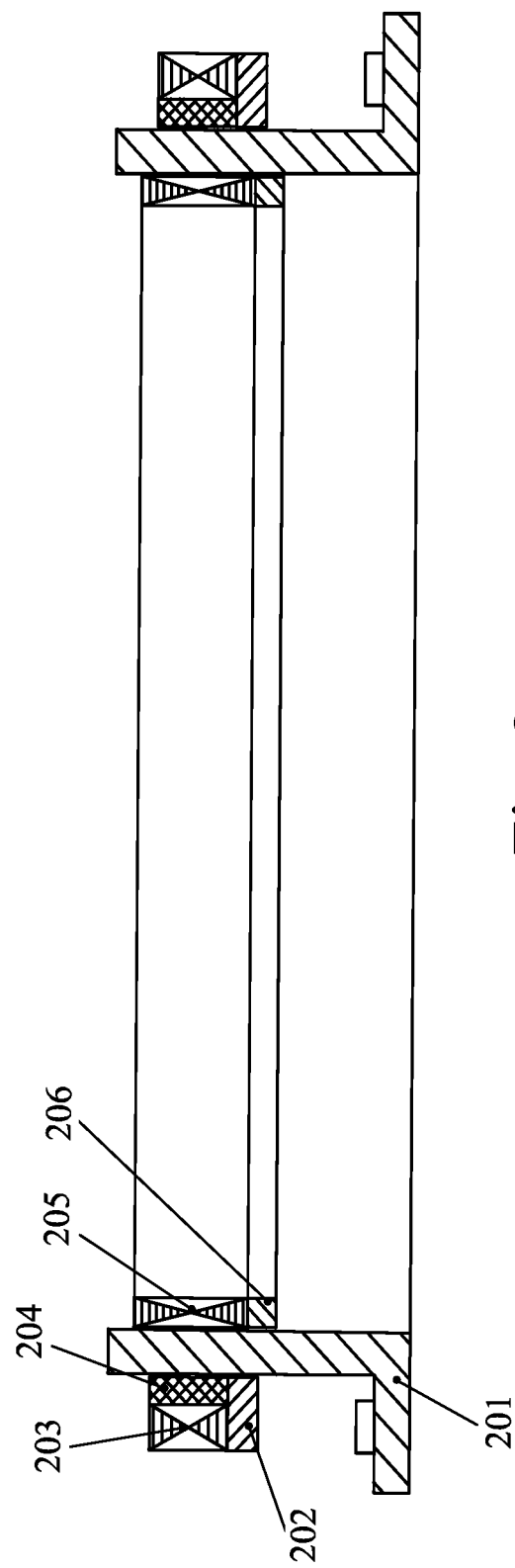
FIG. 8 is a schematic diagram illustrating a structure of a high-speed motor of a five DOFs single-gimbal MSCMG according to various embodiments of the present disclosure.

FIG. 8 is a schematic diagram illustrating a structure of the high-speed motor (12) according to various embodiments of the present disclosure. The high-speed motor (12) consists of a second stator portion (a cup-shaped stator) (201), a motor external rotor pressing plate (202), an outer rotor core (an external rotor lamination) (203), a permanent magnet (204), an inner rotor core (an internal rotor lamination) (205) and an internal rotor pressing plate (206).

The cup-shaped stator (201) is located between the permanent magnet (204) and the internal rotor lamination (205), fixedly connected with the base (11) through screws and a connecting plate, and is a static part of the motor, and others are rotating parts. A radial outer side of the permanent magnet (204) is the external rotor lamination (203), and a radial inside is the internal rotor lamination (205). The motor external rotor pressing plate (202) is installed on the external rotor lamination (203) and an axial lower end of the permanent magnet (204). The internal rotor pressing plate (206) is installed at an axial lower end of the internal rotor lamination (205).

Figure 9:
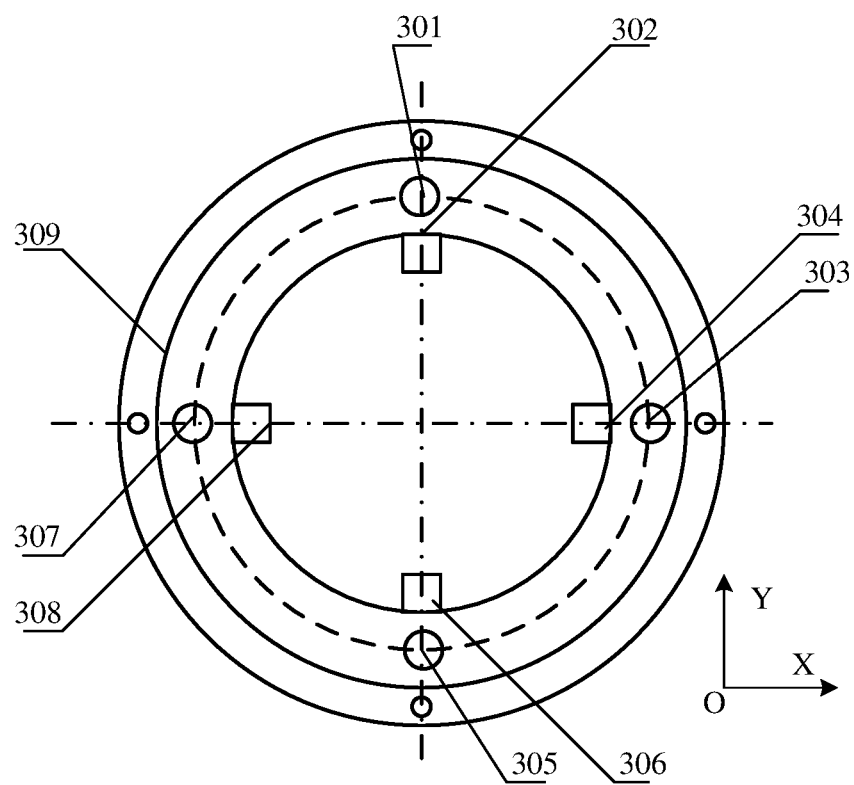
FIG. 9 is a schematic diagram illustrating a structure of an integrated displacement sensor for radial and axial directions of a five DOFs single-gimbal MSCMG according to various embodiments of the present disclosure.

FIG. 9 is a schematic diagram illustrating the integrated displacement sensor for radial and axial directions (9) according to various embodiments of the present disclosure. The integrated displacement sensor for radial and axial directions (9) includes probes (301)-(308) and a sensor housing (309). The probes (301), (303), (305) and (307) are uniformly placed on an axial end face in the ±X and ±Y directions respectively, to form an axial probe assembly; and the probes (302), (304), (306) and (308) are uniformly placed on a radial circumference in the ±X and ±Y directions respectively, to form a radial probe assembly.

The axial probe assembly completes the detection of three generalized displacement, i.e., axial translation and two radial tilting motions, and the radial probe assembly completes the detection of two radial translation displacements.

The sensor housing (309) shields electromagnetic interference and a detection circuit is arranged inside the sensor housing (309), to complete the extraction of displacement information. The placement way of the sensor probes is not restricted in embodiments of the present disclosure, as long as the orthogonality of four radial probes and four axial probes is guaranteed. The relative position of the radial probes and the axial probes could be arbitrary.

Figure 10:
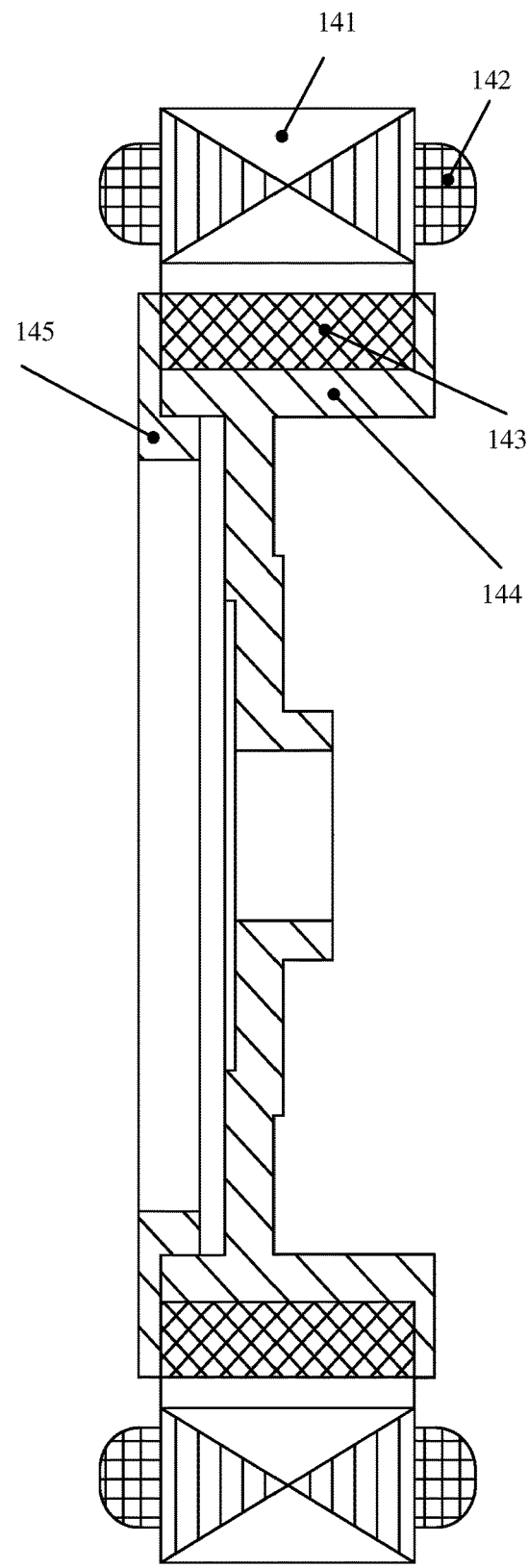
FIG. 10 is schematic diagram illustrating a structure of a gimbal motor of a five DOFs single-gimbal MSCMG according to various embodiments of the present disclosure.

The gimbal motor (18) shown in FIG. 10 mainly includes a stator lamination (141), a stator winding (142), a rotor permanent magnet (143), a rotor core (144) and a rotor pressing plate (145). The stator lamination (141) and the stator winding (142) are static parts of the gimbal motor (18), and others are rotating parts. The stator lamination (141) is in an interference fit with the gimbal (17), and the rotor permanent magnet (143) is in an interference fit with the rotor core (144). The rotor core (144) is made from a 1J22 bar with good permeability, and connected with the gimbal shaft (15) through the interference fit.

Figure 11:
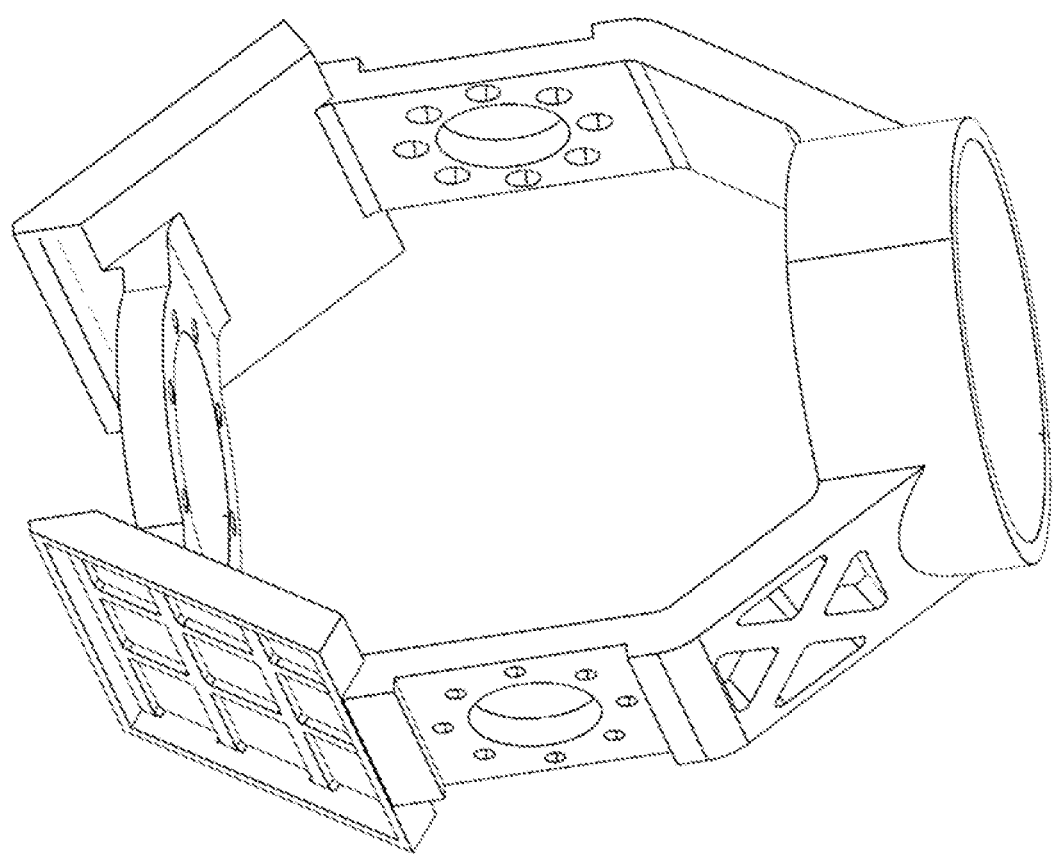
FIG. 11 is a schematic diagram illustrating a gimbal according to various embodiments of the present disclosure.

FIG. 11 is a schematic diagram illustrating a structure of the gimbal according to various embodiments of the present disclosure. The gimbal adopts a symmetrical structure, and is octagonal generally; two connecting ends are designed on the left and right of the gimbal, each of which is designed with eight threaded holes respectively for connecting a bearing seat of the gimbal shaft (15) and a bearing seat of the shaft at the gimbal motor (18); and one side of the gimbal between the connecting ends adopts a mesh structure to reduce weight, and the other side is designed with a groove for placing a circuit board for controlling the gimbal motor (18) and the gimbal shaft (15).

The foregoing descriptions are merely some embodiments of the present disclosure, but are not intended to limit the present disclosure. Any modification, equivalent replacement, or improvement made within the principle of the present disclosure shall fall within the protection scope of the present disclosure.

What is claimed is:

1. A magnetically suspended control moment gyroscope MSCMG comprising:
   a housing;
   a shaft, arranged in an inner cavity of the housing;
   a radial magnetic bearing, comprising: a first rotor portion and a first stator portion fixed to the shaft, wherein the first stator portion of the radial magnetic bearing comprises:
      a first stator magnetic ring;
      a second stator magnetic ring;
      a stator permanent magnet, between the first stator magnetic ring and the second stator magnetic ring;
      a first stator core, outside the first stator magnetic ring, and comprising four magnetic poles in ±X and ±Y directions, and each of the four magnetic poles is with a coil; and
      a second stator core, outside the second stator magnetic ring, and comprising four magnetic poles in ±X and ±Y directions, and each of the four magnetic poles is with a coil:
   the first rotor portion of the radial magnetic bearing comprises:
      a rotor magnetic ring;
      a first rotor core, outside the first stator core, and fixed on an inner wall of the rotor magnetic ring, there are air gaps between the first stator core and the first rotor core; and
      a second rotor core, outside the second stator core, and fixed on the inner wall of the rotor magnetic ring, there are air gaps between the second stator core and the second rotor core;
      an first axial magnetic bearing and a second axial magnetic bearing, wherein the first axial magnetic bearing is fixed to an first end of the first stator portion, the second axial magnetic bearing is fixed to a second end of the first stator portion;
      a wheel body, set in the radial magnetic bearing, fixed to the first rotor portion;
      a first axial thrust plate and a second axial thrust plate, wherein the first axial thrust plate is fixed to a first end of the wheel body, and is on a first end of the first axial magnetic bearing, and the second axial thrust plate is fixed to a second end of the wheel body, and is under a first end of the second axial magnetic bearing.

2. The MSCMG according to claim 1, wherein
   the wheel body is suspended in an axial direction between the first axial magnetic bearing and the second axial magnetic bearing, when the first axial magnetic bearing attracts the first axial thrust plate and the second axial magnetic bearing attracts the second axial thrust plate.

3. The MSCMG according to claim 1, further comprising:
   an integrated displacement sensor for radial and axial directions, arranged outside the first axial thrust plate, wherein there are axial detection gaps and radial detection gaps between axial probes of the integrated displacement sensor for radial and axial directions and the first axial thrust plate; and
   a radial displacement sensor, arranged outside the second axial thrust plate, wherein there are radial detection gaps between the radial displacement sensor and the second axial thrust plate.

4. The MSCMG according to claim 3, wherein the first axial thrust plate and the second axial thrust plate are respectively provided with a stepped hole; the MSCMG further comprising:
   a first protective bearing, set in the shaft and in the stepped hole of the first axial thrust plate, wherein there are radial protective gaps and axial protective gaps between the first protective bearing and the stepped hole of the first axial thrust plate; and
   a second protective bearing, set in the draft and in the stepped hole of the second axial thrust plate, wherein there are radial protective gaps and axial protective gaps between the second protective bearing and the stepped hole of the second axial thrust plate.

5. The MSCMG according to claim 3, wherein
   the radial displacement sensor is configured to detect a radial displacement of the second end of the wheel body;
   the integrated displacement sensor for radial and axial directions comprises:
   four radial probes, arranged orthogonally for detecting a radial displacement of the first end of the wheel body; and
   four axial probes, arranged orthogonally for detecting an axial displacement of the first end of the wheel body.

6. The MSCMG according to claim 1, further comprising:
   a base, engaged with the housing to close the inner cavity of the housing; and
   a motor, arranged on the base, for driving the wheel body to rotate.

7. The MSCMG according to claim 6, wherein the motor comprises:
   a second stator portion, fixed to the base by a connecting plate;
   an outer rotor core, outside the second stator portion, and fixed to the wheel body; and
   an inner rotor core, inside the second stator portion, and fixed to the wheel body.

8. The MSCMG according to claim 1, wherein
   when the wheel body is radially translated, the wheel body is adjusted in the radial direction by controlling current in the coils.

9. The MSCMG according to claim 8, wherein when the wheel body is radially translated, for the magnetic poles in the first stator core and in the second stator core,
   the current in the coil on one of the magnetic poles in the first stator core and the second stator core is increased, when an air gap between that magnetic pole and the first rotor portion is larger, and the current in the coil on that the magnetic pole in the first stator core and the second stator core is decreased, when the air gap between that magnetic pole and the first rotor portion is smaller.

10. The MSCMG according to claim 1, wherein
the first axial magnetic bearing and the second axial magnetic bearing respectively comprises eight axial magnetic bearing stator units, the eight axial magnetic bearing stator units are respectively distributed in ±X, ±Y, ±45° and ±135° directions;

wherein each of the eight axial magnetic bearing stator units is provided with a slot having an E-shaped cross section, and each of the eight axial magnetic bearing stator units comprises the following at the slot: a second stator magnetic pole, a first stator magnetic pole radially inward of the second stator magnetic pole, and a third stator magnetic pole radially outward of the second stator magnetic pole; wherein protrusions of the first stator magnetic pole and the third stator magnetic pole are higher than a protrusion of the second stator magnetic pole; in each of the axial magnetic bearing stator units in the ±X, ±Y directions, the first stator magnetic pole is provided with an inner coil, and the third stator magnetic pole is provided with an outer coil; in each of the axial magnetic bearing stator units in the ±45° and ±135° directions, the second stator magnetic pole is provided with a middle coil;

the first axial thrust plate and the second axial thrust plate respectively comprises an annular groove, an opening direction of the annular groove of the first axial thrust plate is opposite to an installation direction of the annular groove of the second axial thrust plate;

the annular groove has a "" shape in cross section, and the annular groove comprises: a central protrusion, an inner side depression on a radial inner side of the middle protrusion, and an outer side depression on a radial outer side of the middle protrusion;

wherein the first stator magnetic pole of each of the axial magnetic bearing stator units is aligned with the inner side depression and forms an inner air gap, the second stator magnetic pole of each of the axial magnetic bearing stator units is aligned with the middle protrusion and forms a middle air gap, the third stator magnetic pole is aligned with the outer side depression and forms an outer air gap.

11. The MSCMG according to claim 10, wherein
when the wheel body is radially tilted or axially translated, the wheel body is adjusted by controlling current in the middle coils, the current in the inner coils, and the current in the outer coils.

12. The MSCMG according to claim 11, wherein when the wheel body is axially translated, for the second stator magnetic pole of any one of the axial magnetic bearing stator units in ±45° and ±135° directions, current in the middle coil on the second stator magnetic pole of that axial magnetic bearing stator unit is increased when a middle air gap on that axial magnetic bearing stator unit becomes larger, and the current in the middle coil on the second stator magnetic pole of that axial magnetic bearing stator unit is reduced, when the middle air gap on that axial magnetic bearing stator unit becomes smaller;

when the wheel body is radially tilted, for the second stator magnetic pole of any one of the axial magnetic bearing stator units in ±X and ±Y directions, an electromagnetic force by the inner coil and the outer coil of that axial magnetic bearing stator unit is enhanced when air gaps of that axial magnetic bearing stator unit become larger, and the electromagnetic force by the inner coil and the outer coil of that axial magnetic bearing stator units is enhanced, when the air gaps of that axial magnetic bearing stator unit become smaller.

13. The MSCMG according to claim 1, further comprising:
a gimbal;
a gimbal shaft, having a first end fixed to the housing, a middle portion of the gimbal shaft is mounted to a first end of the gimbal by mechanical bearings;
a gimbal motor shaft, mounted to a second end of the gimbal by bearings, a first end of the gimbal motor shaft is fixed to the housing;
a gimbal motor, driving the gimbal motor shaft to rotate.

* * * * *

UNITED STATES PATENT AND TRADEMARK OFFICE
CERTIFICATE OF CORRECTION

PATENT NO. : 11,465,783 B2  
APPLICATION NO. : 16/689913  
DATED : October 11, 2022  
INVENTOR(S) : Jinji Sun et al.

Page 1 of 1

It is certified that error appears in the above-identified patent and that said Letters Patent is hereby corrected as shown below:

In the Claims

At Column 17, Line 45, "coil:" should be -- coil; --.

At Column 17, Line 57, "an first" should be -- a first --.

At Column 17, Line 59, "an first" should be -- a first --.

Signed and Sealed this  
Second Day of July, 2024

Katherine Kelly Vidal  
*Director of the United States Patent and Trademark Office*